T. M. GREEN.
Fertilizer.
No. 29,689.
Patented Aug. 21, 1860.
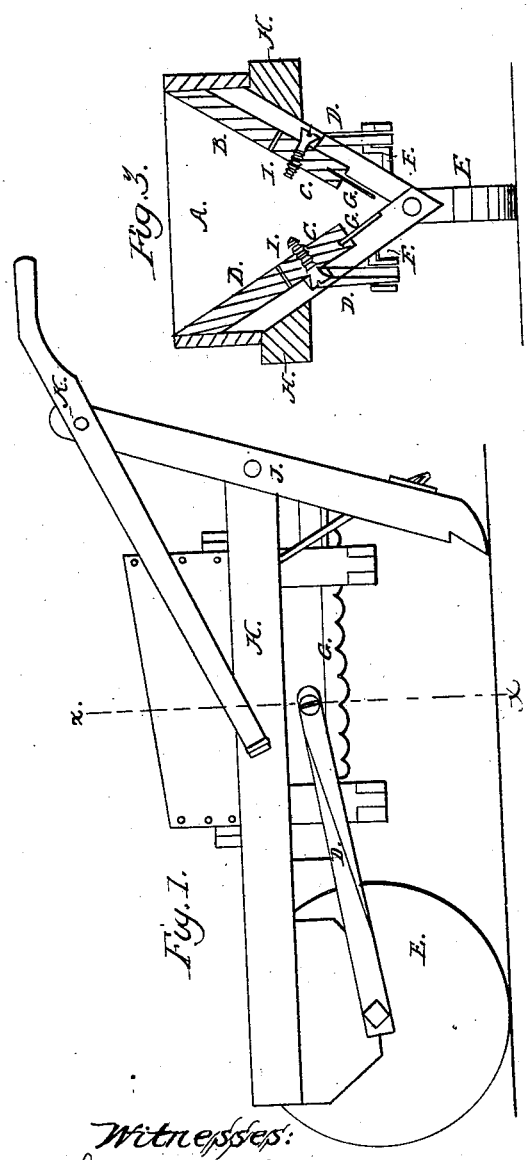
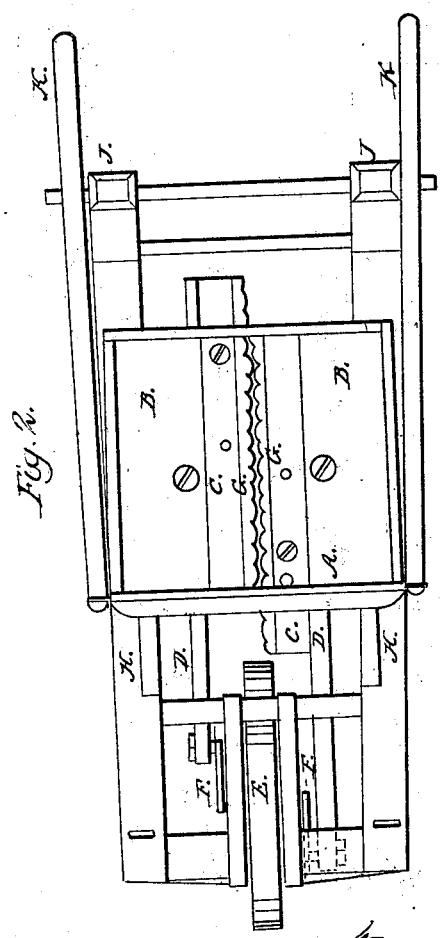

UNITED STATES PATENT OFFICE.

THOMAS M. GREEN, OF MILLEDGEVILLE, GEORGIA.

IMPROVEMENT IN SEED-PLANTERS.

Specification forming part of Letters Patent No. 29,689, dated August 21, 1860.

*To all whom it may concern:*

Be it known that I, THOMAS M. GREEN, of Milledgeville, in the county of Baldwin and State of Georgia, have invented a new and useful Improvement in Seed and Manure Distributers; and I do hereby declare that the following is a full, clear, and exact description of the same, reference being had to the accompanying drawings, forming a part of this specification, in which—

Figure 1 is a side elevation, Fig. 2 a plan, and Fig. 3 a vertical cross-section, of the machine.

Similar letters of reference in each of the several figures indicate corresponding parts.

The nature of my invention consists in the arrangement of sliding bars and serrated strips, stirrers fastened to the sliding bars, connecting-rods, and driving-shaft cranks, for the purpose hereinafter to be described.

To enable others skilled in the art to make and use my invention, I will proceed to describe its construction and operation.

The seed-box A is made with both sides B B inclined toward each other. Bars C C, similarly inclined, form a continuation of the sides B B, the upper edges of the bars being in contact with the lower edges of the sides. Metal strips G G are inserted into the lower edges of the bars and extend far enough downward almost to meet. The lower edges of the strips are serrated. A number of stirrers, I I, are inserted through and project beyond the inner surfaces of the bars C C. Connecting-rods D D are pivoted one to each of the two bars C C, and the front end of each of the two connecting-rods is hung to a crank, F, on each side of the driving-wheel. The two cranks are arranged on the driving-shaft at an angle of one hundred and eighty degrees in relation to each other, so that as the driving wheel and shaft revolve the connecting-rods will reciprocate in opposite directions. The connecting-rods impart a horizontal reciprocating motion to the bars C C, which play in suitable ways, so as to keep their upper edges in contact with the lower edges of the sides B B and confine them to a horizontal motion. As the serrations of the strips G G pass by each other the seed is dropped between them on the ground. The stirrers I I serve to stir the seed and prevent the choking up of the seed-box.

This is a very simple arrangement, not liable to get out of order, and can be manufactured at a very low price, as all the parts can be made of wood, if desired.

H is the frame of the machine. K K are the handles, and J J the standards, to which plows for covering the seeds with the soil may be attached.

What I claim as my invention, and desire to secure by Letters Patent, is—

The arrangement of sliding bars C C and serrated strips G G, stirrers I I, fastened to the sliding bars, connecting-rods D D, and driving-shaft cranks F F, substantially as and for the purposes set forth.

THOMAS M. GREEN.

Witnesses:
R. M. ORME, Sen.,
R. M. ORME, Jr.